United States Patent Office 2,965,490
Patented Dec. 20, 1960

2,965,490
FLAVOR PRODUCT AND PROCESS

Irving I. Rusoff, Park Ridge, N.J., assignor to General Foods Corporation, White Plains, N.Y., a corporation of Delaware No Drawing. Filed Apr. 2, 1959, Ser. No. 803,574

13 Claims. (Cl. 99—23)

This invention relates to natural chocolate flavor and to a process for making the same. More particularly, the invention is concerned with a chocolate flavor component which may be used as a base flavor factor in combination with other flavor factors such as astringency, bitterness, and the like, which are present in natural chocolate products. This application is a continuation-in-part of my earlier filed co-pending applications, Serial No. 655,200, filed April 26, 1957, now U.S. Patent No. 2,835,592, Serial No. 685,414, filed August 23, 1957, now U.S. Patent No. 2,835,593, and Serial No. 725,807, filed April 2, 1958, now abandoned.

Flavor derived from cacao for manufacture of chocolate and cocoa products involves numerous widely separated and distinct steps commencing at the plantations in tropical environs and continuing until incorporation of the flavor in a finished product which can be a confectionery, beverage, or like food product. From the time cacao seeds are removed from their pods and are subjected to well-known processes which include fermentation, drying, grading, etc., obscure chemical reactions take place that condition the beans for roasting, during which the characteristic flavor of chocolate is developed. While progress has been made in the art of developing natural chocolate flavor, the processes involved require a high degree of control and are widely separated, the flavor varies with the source of the cacao, and the cost is excessive.

The invention has for its primary object the elimination of reliance on fermented cacao as a source of chocolate flavor by development of such flavor from cacao which hase not been fermented. It is a particular object of the present invention to produce a flavor having the scent of the base flavor of premium chocolate.

It has been discovered that a reaction mixture containing the partially hydrolyzed cacao protein and cacao reducing sugars can be reacted to produce a natural chocolate flavor component.

The base flavor factor may be produced by a proteolytic degradation of unfermented cacao nibs or shell and a hydrolysis of the cacao carbohydrate to simple sugars. The reaction is carried out by the application of heat to a mixture of the reagents at a temperature and for a time sufficient to produce said base flavor factor in a substantially anhydrous condition at least at the end of the reaction. By "simple sugars" is meant a pentose, a hexose, a reducing polysaccharide, or a non-reducing polysaccharide which is a precursor of a reducing saccharide. By "base flavor factor" is meant a flavor component which is used in combination with bitterness, astringency and other flavor factors in the cacao bean to provide chocolate flavor. The base flavor factor provides fullness and body which levels out and prolongs the taste sensation.

If defatted chocolate base flavor is desired, then the natural cacao material may be treated with a solvent such as an alcohol, an ether, hexane, or acetone, to selectively remove the cocoa fat portion of the cacao material. This will ensure a greater water dispersibility of the final product. Alcohols which may be used are typified by methanol or ethanol, while methyl ethyl ether or diethyl ether are among the ethers which can be used. If the cacao material has been partially hydrolyzed, by any method, then the cocoa fat, which is an ester, has been partially hydrolyzed to the free fatty acids and glycerol. If the cocoa fat extraction treatment is performed after the hydrolysis has occurred, then both the fat and the free fatty acids will be removed by the organic solvent, as shown above.

The reaction to develop the above-described base flavor factor is carried out by the application of heat to a mixture of the reagents at a temperature and for a time sufficient to produce a substantially anhydrous condition at least at the end of the reaction. The reaction is preferably carried out at a temperature of 120°–150° C., the time for such reaction varying inversely with temperature. Any one of a number of well-known apparatus may be employed to carry out the reaction such as a belt dryer, a pan roaster, and the like. The reaction which results in the production of the base flavor component appears to be accompanied by a substantial decrease in the measurable amino nitrogen and reducing sugars in the reaction mixture.

The protein and carbohydrate degradation technique employed herein to produce the partially hydrolyzed cacao protein and partially hydrolyzed cacao carbohydrate may be enzymatic, acidic, or alkaline, although it is preferred for the purpose of the present process that enzymatic or acidic hydrolysis be utilized. Of these protein and carbohydrate hydrolysis methods that which is most preferred is the one employing enzymes. Such enzymes include the proteolytic enzymes such as trypsin, rennin, pepsin, erepsin, pancreatin, papain, bromelin, and the like, and carbohydrases such as amylase. The use of alkaline degradation of the protein frequently results in the development of undesirable off-flavors in the final product, the base chocolate flavor factor. Both alkaline and acid degradation are more difficult to control as compared with the enzyme degradation, require expensive, corrosion-proof equipment and, moreover, in some cases destroy certain amino acids which as set forth hereinafter are desired from the standpoint of obtaining best results. The degree of hydrolysis or proteolysis required in the present invention is substantially between 8% and 55%, viz., 8–55% of the total nitrogen in the hydrolyzate is amino nitrogen. Generally, it has been found that as the degree of proteolysis increases, the flavor intensity of the base flavor factor also increases. All strong acids, such as hydrochloric acid or sulfuric acid, may be used for the acidic degradation, while all alkalis, such as sodium hydroxide or potassium hydroxide, may be used for the alkaline degradation.

It is believed that the degree of protein hydrolysis employed as described above is such that the peptides in the protein hydrolyzates are di-, tri-, and the somewhat more complex peptides which can best be described as "oligopeptides." The term "oligopeptides" is employed herein to denote di, tri-, and up to penta- and hexapeptides. A cacao protein hydrolyzate also contains amino acids such as alanine, threonine, glycine, glutamic acid, aspartic acid, tyrosine, valine, methionine, arganine, lysine, leucine, isoleucine, phenylalanine, and such amino acids will doubtlessly be present in the flavor-producing reaction, playing an important role in the production of the base flavor factor.

The preferred source of material is whole or broken unfermented cacao material, which may include any or all the component parts of the cacao bean. Advantageously, cacao material includes abundant quantities of carbohydrate which can be hydrolyzed to give glucose, fructose, and arabinose, all reducing sugars, as well as cacao proteins, so that the base flavor factor can be obtained from a single raw material, by hydrolyzing the cacao protein, and the cacao carbohydrate, and then reacting the digest at an elevated temperature.

The above-specified operable range of partial hydrolysis for cacao proteins, viz., 8–55%, is an expression of the percent hydrolysis within which all of the proteins tested have been found to yield the base flavor factor under the reaction conditions of the present invention. Partial degradation of cacao material from 8–55% hydrolysis results in increased flavor levels as proteolysis increases; however, prolonged digestion periods and relatively high levels of enzyme, e.g., trypsin, are required to achieve over 30% hydrolysis, and since base flavor of adequate strength is produced at the lower levels of 8–30% hydrolysis and this degree of hydrolysis is obtained in a relatively short period, this latter narrower range is preferred from a practical operating standpoint.

As indicated herein, percent hydrolysis is intended to means the percent of total nitrogen which is amino nitrogen, the former being determined by the Kjeldahl method and the latter being determined by the formol method.

In the work described herein, amino nitrogen was determined by the method described in David M. Greenberg's "Amino Acids and Proteins," Charles C. Thomas, Springfield, Illinois (1951), on pages 80, 81 and 246. Another formol titration method is that developed by Sorenson and described in the "Official Methods of Analysis of the Association of Official Agricultural Chemists," 7th ed., A.O.A.C., Washington, D.C. (1950), on page 365. Generally, in the case of pure proteins, formol nitrogen determination by the Greenberg method can be converted to Sorenson values by multiplying the Greenberg values by the factor 0.56.

As indicated above, the cacao material is heated at a temperature and for a time sufficient to create a substantially anhydrous condition at least at the end of the reaction. It appears that the properly mixed reactants require removal of sufficient quantities of water to provide a substantially anhydrous somewhat molten mixture for roasting to develop the chocolate flavor of the present invention. However, the term "substantially anhydrous" is not meant to exclude the presence of some water in solution. In fact, a small amount of water is formed continuously during the course of the reaction, which fact alone is sufficient to preclude a completely anhydrous molten state at the end of the reaction. No analytical methods are available which permit determining with accuracy the maximum amount of water permissible at the end of the reaction. Good results have been obtained when the end product at the reaction temperature contained sufficient moisture to render it more or less tacky in nature, and I believe that as much as 5–10% moisture may have been present in some of such cases. These figures cannot be determined definitely, however, and in practice it is satisfactory to observe the rule that the product upon cooling to room temperature is substantially solid and substantially dry to the touch. The term "substantially anhydrous" is to be understood to include the presence of moisture within this limitation.

The base flavor factor resulting from the process of the invention is a material which is substantially dispersible in aqueous medium such as water, milk, and the like. The product is capable of incorporation into a number of food products as the base chocolate flavor. The base flavor factor of the present invention with other flavor factors of chocolate can be included in a wide variety of confectionery products such as chocolate bars, candy coatings, cocoa powders for milk drinks and baked goods.

The following examples illustrate embodiments of the invention, but it is to be understood that these examples are for purposes of illustration and that the invention is not limited thereto, since various changes can be made by those skilled in the art without departing from its scope and spirit. The term "cacao material" as employed in the present invention is intended to refer to various types of cacao containing materials such as cacao beans, nibs, and shell either separately or in combination.

In accordance with one specific embodiment of this invention, unfermented, unroasted cacao beans can be cracked and fanned to break the beans and separate the shell portion which may be treated separately if desired in the same manner as the fleshy portion of the bean to obtain a similar flavor product. Fifty pounds of this cacao material and 150 pounds of water were heated to 47° C. in a stainless steel steam jacketed kettle. The heated cacao material was then adjusted from an original pH of 6.75 to a pH of 8.65 using a 10% aqueous solution of sodium hydroxide. To this was added 169 gms. of pancreatin (mascerated bovine pancreas gland) and 180 gms. amylase, the pancreatin and the amylase having been previously dispersed in cold water prior to addition of the cacao material. The batch was then allowed to digest while maintaining this temperature of 47° C. for 6 hours. It was found that these reaction conditions provided sufficient digestion to produce the necessary degree of hydrolysis.

The digest after 6 hours (approximately 30% protein hydrolysis and 100% carbohydrate hydrolysis) can then be heated to 90° C. for 15 minutes to deactivate the enzymes. The batch is then heated at 90° C. until dry. For the roasting step the dry material is remoistened by addition of 25% water and spread in an even layer approximately ¼ inch thick on a stainless steel tray. This tray is then placed in an oven at 285° F. and the material allowed to roast for 20 minutes. Following roasting the material is allowed to cool and is removed from the tray. The roasted chocolate material is ground and milled to form a powdery brown water-soluble flavor product having fragrant chocolate aroma and flavor notes.

Ten grams of the chocolate powder are dispersed along with 18 grams of sugar and 200 grams of cold milk. The resulting beverage has an excellent chocolate flavor and aroma.

It will be understood that while the invention has been described in part by means of specific examples, reference should be had to the appended claims for a definition of the scope of the invention.

What is claimed is:

1. A process for producing a chocolate base flavor factor comprising partially hydrolyzing unfermented green cacao protein and hydrolyzing the cacao carbohydrate to produce a mixture of simple sugars, reacting the partially hydrolyzed cacao protein with said cacao sugars, said reaction being carried out by the application of heat to a mixture of the reagents at a temperature and for a time sufficient to produce said base flavor factor in a substantially anhydrous condition at least at the end of the reaction.

2. The process of claim 1 in which the cacao protein is hydrolyzed to 8–55% and the reaction temperature is 120°–150° C.

3. The process of claim 1 in which the cacao protein is enzymatically degraded 8–30%.

4. The process of claim 1 in which the cacao protein is degraded by acidic hydrolysis.

5. The process of claim 3 in which the protease is trypsin.

6. The process of claim 3 in which the protease is pancreatin.

7. The process of claim 1 in which the protein hydrolyzate contains oligopeptides.

8. The process of claim 1 in which the cacao carbohydrate is hydrolyzed by a carbohydrase.

9. The process of claim 1 in which the cacao material is digested by an acid which serves to hydrolyze both the cacao carbohydrate and the cacao protein.

10. The process of claim 9 in which the acid is hydrochloric acid.

11. The process of claim 8 in which the enzyme is amylase.

12. The process of claim 1 in which the cacao is treated with a fat solvent.

13. The product prepared by the process of claim 1.

References Cited in the file of this patent

UNITED STATES PATENTS

| | | |
|---|---|---|
| 1,854,355 | Wallerstein | Apr. 19, 1932 |
| 2,512,663 | Masurovsky | June 27, 1950 |
| 2,558,854 | Kempf et al. | July 3, 1951 |
| 2,813,795 | Hale | Nov. 19, 1957 |
| 2,835,585 | Rusoff | May 20, 1958 |